(12) United States Patent
Randall

(10) Patent No.: US 7,014,586 B2
(45) Date of Patent: Mar. 21, 2006

(54) ELECTRO-MECHANICAL TRANSMISSION SYSTEMS

(75) Inventor: Steven Paul Randall, Leeds (GB)

(73) Assignee: Switched Reluctance Drives Limited, Harrogate (GB)

( * ) Notice: Subject to any disclaimer, the term of this patent is extended or adjusted under 35 U.S.C. 154(b) by 0 days.

(21) Appl. No.: 10/691,828

(22) Filed: Oct. 23, 2003

(65) Prior Publication Data

US 2004/0082419 A1    Apr. 29, 2004

(30) Foreign Application Priority Data

Oct. 23, 2002  (GB) ................................ 0224714
Dec. 17, 2002  (GB) ................................ 0229381

(51) Int. Cl.
*F16H 3/72*  (2006.01)
(52) U.S. Cl. .................. 475/2; 475/5; 477/3; 477/4
(58) Field of Classification Search .............. 475/1, 475/2, 5; 477/2, 3, 4, 7
See application file for complete search history.

(56) References Cited

U.S. PATENT DOCUMENTS 5,991,683 A * 11/1999 Takaoka et al. ............ 701/102
6,371,878 B1 * 4/2002 Bowen ............................ 475/5
6,405,818 B1 * 6/2002 Anthony et al. ........... 180/65.8
6,811,508 B1 * 11/2004 Tumback ........................ 475/5

FOREIGN PATENT DOCUMENTS

GB   2 363 173 A     12/2001
JP   11-113104    *  4/1999
WO   WO 01/94142 A1  12/2001

OTHER PUBLICATIONS

Stephenson, et al., "The Characteristics, Design and Applications of Switched Reluctance Motors and Drives," PCIM '93, Nürnberg, Germany, Conference & Exhibition, Jun. 21-24, 1993, pp. 1-68.

* cited by examiner

*Primary Examiner*—Ha Ho
(74) *Attorney, Agent, or Firm*—Dicke, Billig & Czaja, PLLC

(57) ABSTRACT

An electro-mechanical transmission system, driven by a prime mover, includes two epicyclic gearsets connected between input and output shafts, and two electrical machines having their rotors connected to respective elements of the two gearsets. The torque on the output shaft is boosted by a controller, which dumps energy from the system when one of the machines is acting as a generator and the other as a motor.

23 Claims, 3 Drawing Sheets

ELECTRO-MECHANICAL TRANSMISSION SYSTEMS

CROSS-REFERENCE TO RELATED APPLICATION

The subject matter of this application is related to the subject matter of British Patent Applications Nos. GB 0224714.6, filed Oct. 23, 2002 and GB 0229381.9, filed Dec. 17, 2002, priority to both of which is claimed under 35 U.S.C. § 119 and both of which are incorporated herein by reference.

BACKGROUND OF THE INVENTION

1. Field of the Invention

The present invention relates to a method of operating electro-mechanical transmission systems.

2. Description of Related Art

A known form of electro-mechanical transmission system comprises two compounded epicyclic gearsets, having an input shaft driven by a prime mover and connected to one gear element of one gearset, an output shaft providing output torque and connected to one gear element of the other gearset, two electrical machines, the rotors of which are connected to respective gear elements of the two gearsets and each of which is able to operate either as a motor or a generator and the stators of which are connected together via a controller arranged to control the flow of electrical power between the machines. Other known forms of electro-mechanical transmission systems comprise three or more compounded gearsets.

Such transmission systems have a continuously variable transmission ratio and are preferably of single regime type, that is to say they can provide all the range of gear ratios without it being necessary to provide a clutch or the like to enable switching over to a further arrangement to obtain all of the desired range of transmission ratios.

An epicyclic gearset typically comprises a sun wheel in mesh with a plurality of planet wheels, which are rotatably mounted on a common carrier and are in mesh with an annulus wheel. However, it is possible under certain circumstances for an epicyclic gearset to have only two of these gear elements, whereby one of the sun wheel, planet wheels and annulus wheel is omitted.

A transmission system of the type referred to above is disclosed in WO-A-01/94142 (Moeller) which is incorporated herein by reference. This known transmission system comprises an input shaft connected to the planet carrier of the first gearset, which is also connected to the annulus wheel of the second gearset, and an output shaft connected to the planet carrier of the second gearset. The sun wheel of the first gearset is connected to the sun wheel of the second gearset. The rotors of the first and second electrical machines are respectively connected to the annulus wheel of the first gearset and the sun wheel of the second gearset. The electrical connections of the two stators are connected together via a control system.

In use, one of the electrical machines generally acts as a generator and transfers electrical power to the other electrical machine, which acts as a motor. A proportion of the power transmitted by the transmission, typically up to about one third of the total, is handled by the electrical machines. For a given input speed, the output torque of the transmission system may be varied by controlling the power flow between the two electrical machines. The input power to the transmission system is always the output power plus the mechanical and electrical losses.

The electrical power transferred between the two electrical machines varies as the output speed varies and reaches zero at two different output speeds. When the power is zero, one of the electrical machines is stationary. Power may be transmitted between the electrical machines even at zero output speed when, e.g., tractive effort is required to pull away from rest. If no electrical power is transmitted, the transmission provides a "geared neutral", i.e. there is no torque applied to the output shaft even though the input shaft is rotating.

The known transmission may have many different applications, which are required to be driven by a source of motive power. In the art the source of motive power is typically referred to as a prime mover. In particular the transmission system is useful as the main propulsion transmission for a motor vehicle. A rechargeable battery may be provided to enable the vehicle to be of hybrid type, that is to say the electric battery may supply electric power to one or both of the electrical machines to increase the torque on the output shaft. At those times when excess power is available, electric power may be transmitted from one or both of the electrical machines to the battery to recharge it.

As mentioned above, the transmission has a geared neutral. If, however, at zero output speed one electrical machine acts as a generator and its power is supplied to the other electrical machine, which is driven as a motor, then torque is applied at the output shaft. If the output shaft is at zero output speed, no work is performed. If one ignores the slight inefficiencies of the two electrical machines and the various meshing gearwheels, if no work is done at the output shaft, then no power is supplied to the input shaft by the vehicle engine. Accordingly, the torque applied to the output shaft is simply the sum of the torques on the two electrical machines.

The output torque available is limited by the ratings of the electrical machines. This means either that the vehicle will accelerate relatively slowly or that the electrical machines must have relatively high ratings, in which event they will be unacceptably large, heavy and expensive. This problem can of course be alleviated to an extent by utilizing the hybrid function of the vehicle, that is to say operating the controller to supply electric power from the battery to that electrical machine which is acting as a motor. This will increase the torque at that electrical machine and thus the torque on the output shaft. However, this increase is not very large and can only be for a relatively short period of time unless both the battery and the electrical machines are of a size, which will make the transmission unacceptably heavy and expensive. It is clear that one of the disadvantages of transmission systems of the type disclosed in WO-A-01/94142 is that they do not provide as much output torque as is sometimes desirable.

SUMMARY OF THE INVENTION

According to one aspect, embodiments of the invention provide a method of increasing the torque applied to the output shaft of an electro-mechanical transmission system, particularly when accelerating from zero or low speed.

According to a first form of the invention there is provided an electro-mechanical transmission system, comprising at least two compounded epicyclic gearsets, one gear element of a first gearset being connected to an input shaft and one gear element of a second gearset being connected to an output shaft, the input shaft being connected to a prime mover, the rotors of two electric machines being connected to respective gear elements of the two gearsets, the electrical connections of the stators of which machines are connected together via a controller arranged to control the flow of electrical power between the machines and an energy receiver, the controller being operable to direct at least a proportion of electric power from that machine which is operating as a generator to the energy receiver. According to this form of the invention it is possible to increase the torque applied to the output shaft for a given prime mover and transmission system without having to modify the machinery. It has been found by the inventor that the torque increase is realized by dissipating some of the power from the prime mover instead of making it available as motive power, according to one example.

Embodiments of the present invention optionally include increasing the torque available at the output shaft by directing electric power from at least one of the machines to an electrical load comprising, for example, a dump resistor.

In practice, electrical power is likely to be taken only from that machine which is operating as a generator. However, it is possible to cause both machines to operate as generators and to take electrical power from both of them.

Embodiments of the invention also optionally include increasing the torque available at the output shaft by mechanically braking at least one of the electrical machines.

Embodiments of the invention also optionally include increasing the torque available at the output shaft by causing one or both of the electrical machines to operate less efficiently. If the two electrical machines are of switched reluctance type, this optionally comprises altering the timing of excitation of one or both machines so that it operates at an efficiency substantially less than the maximum value that may be achieved and thus operates as an electrical load in a manner equivalent to using a dump resistor.

Embodiments of the present invention also optionally include increasing the torque available at the output shaft by directing electric power from at least one of the machines, for example that machine which is operating as a generator, to an electrical load comprising a rechargeable electric battery.

According to another aspect of the present invention there is provided a method of operating an electro-mechanical transmission system of the type comprising at least two compounded epicyclic gearsets, having an input shaft driven by a prime mover and connected to one gear element of a first gearset, an output shaft providing output torque and connected to one gear element of a second gearset, two electrical machines, the rotors of which are connected to respective gear elements of the two gearsets and each of which is able to operate either as a motor or a generator, a third electrical machine, operable as a motor, and having its output shaft connected to one of the input and output shafts of the transmission system, all three machines having the electrical connections of the stators of all three electrical machines being connected together via a controller arranged to control the flow of electrical power between the machines, which method includes increasing the torque available at the output shaft by directing electric power from at least one of the machines, for example that machine which is operating as a generator, to the third electrical machine.

This method will find particular application when the output shaft is rotating relatively slowly. Expressed in its broadest sense, embodiments of the invention embrace increasing the torque available at the output by extracting energy, in electrical or mechanical form, from the transmission system.

The method is thus counter-intuitive and effectively the opposite of what is disclosed in the prior document referred to above in that at the time that maximum torque is required at the output shaft, additional power is not introduced into the transmission system from a battery or the like. Instead power is removed from the transmission system and, surprisingly, this is found to result in an increase in the output torque.

Embodiments of the invention also optionally include monitoring a signal indicative of the level of torque required at the output shaft and extracting energy in mechanical or electrical form from the transmission system when the said signal exceeds a predetermined value.

Clearly, some method aspects of the invention will reduce the overall efficiency of the transmission system. A practical system might therefore avoid dumping energy except when large output torques are required, thereby only invoking aspects of the invention when needed to boost output torque. When aspects of the invention are used to boost torque, the diverted energy is used for some other auxiliary system or stored for later use, for example.

Thus, according to embodiments of the present invention, when, for example, a vehicle incorporating a transmission system of the type referred to is stationary and the vehicle engine is idling, the controller is set so that one of the electrical machines is generating only a small amount of electrical power and this power is transmitted to the other electrical machine. The sum of the torques at the two electrical machines is very small and only this very small torque acts on the output shaft. Movement of the vehicle is prevented by frictional losses and/or application of the vehicle brake.

If gentle acceleration is required, the controller is operated, for example, by an engine management system, which is nowadays commonly provided on motor vehicles and of which the controller will in practice form a part, to increase the electrical power transmitted from the generator to the motor. The torques of both the motor and generator will increase and the torque acting on the output shaft will be the sum of the torques at the motor and the generator and the torque applied by the engine to the input shaft to compensate for the mechanical and electrical losses within the transmission system, which are in practice inevitable. The controller is operated to produce whatever level of torque on the output shaft is desired. As the vehicle starts to move, an increasing amount of work is performed at the output shaft and an increasing proportion of the torque on the output shaft is derived from the vehicle engine.

If, however, rapid acceleration is required, the controller is operated to increase the electrical power transmitted from the generator and at the same time energy is removed from the system, either mechanically, by braking some element of the system, or electrically, e.g. to a dump resistor. The power removed must be supplied by the engine which now adds torque into the system. The torque at the output is the sum of all the torques and therefore increases. When the vehicle is running at low speed, the engine has surplus torque available and it supplies to the input shaft an amount of power equal to the sum of that removed and the amount accounted for by mechanical and electrical losses. The torque applied to the output shaft is thus increased by not only any increase in the torques at the motor and the generator but also the increase in torque on the input shaft.

Method aspects of the invention are used similarly to increase the output torque when the vehicle or the like is already moving relatively slowly. However, in this case, instead of increasing the power supplied to the motor and removing power from the system, a proportion of the power supplied to the motor is diverted, e.g. to a dump resistor. In this case, the torque at the motor will decrease, and the power removed from the system will be additionally provided by the input shaft. However, since the input shaft will generally rotate very much more slowly than the motor shaft, the torque increase on the input shaft will be substantially more than the torque reduction at the motor so that the sum of the torques, i.e. the torque available at the output shaft, is still significantly increased.

Accordingly, with embodiments of the invention, the load is accelerated from rest more rapidly than was previously possible. Alternatively, for a given maximum rate of acceleration from rest, the two electrical machines are smaller, lighter and cheaper than was previously the case.

Embodiments of the invention also embrace an electro-mechanical transmission system comprising at least two compounded epicyclic gearsets, having an input shaft adapted to be driven by a prime mover and connected to one gear element of a first gearset, an output shaft which, in use, provides output torque and is connected to one gear element of a second gearset, two electrical machines, the rotors of which are connected to respective gear elements of the two gearsets and each of which is able to operate either as a motor or a generator and the stators of which are connected together via a controller arranged to control the flow of electrical power between the machines, and a mechanical brake arranged to brake at least one of the electrical machines.

The transmission system optionally does not include a brake but a third electrical machine instead, which is operable as a motor and whose output shaft is connected to one of the input and output shafts and which is connected to at least one of the said two electrical machines to be electrically powered thereby.

The transmission system optionally includes a sensor arranged to produce a signal indicative of the level of torque required at the output shaft, means for monitoring the said signal and means controlled by the monitoring means for extracting power in mechanical or electrical form from the transmission system when the said signal exceeds a predetermined value.

BRIEF DESCRIPTION OF THE DRAWINGS

Further features and details of embodiments of the invention will be apparent from the following description of specific embodiments, which are given by way of example with reference to the accompanying drawings in which.

DETAILED DESCRIPTION OF PREFERRED EMBODIMENTS

Figure 1:
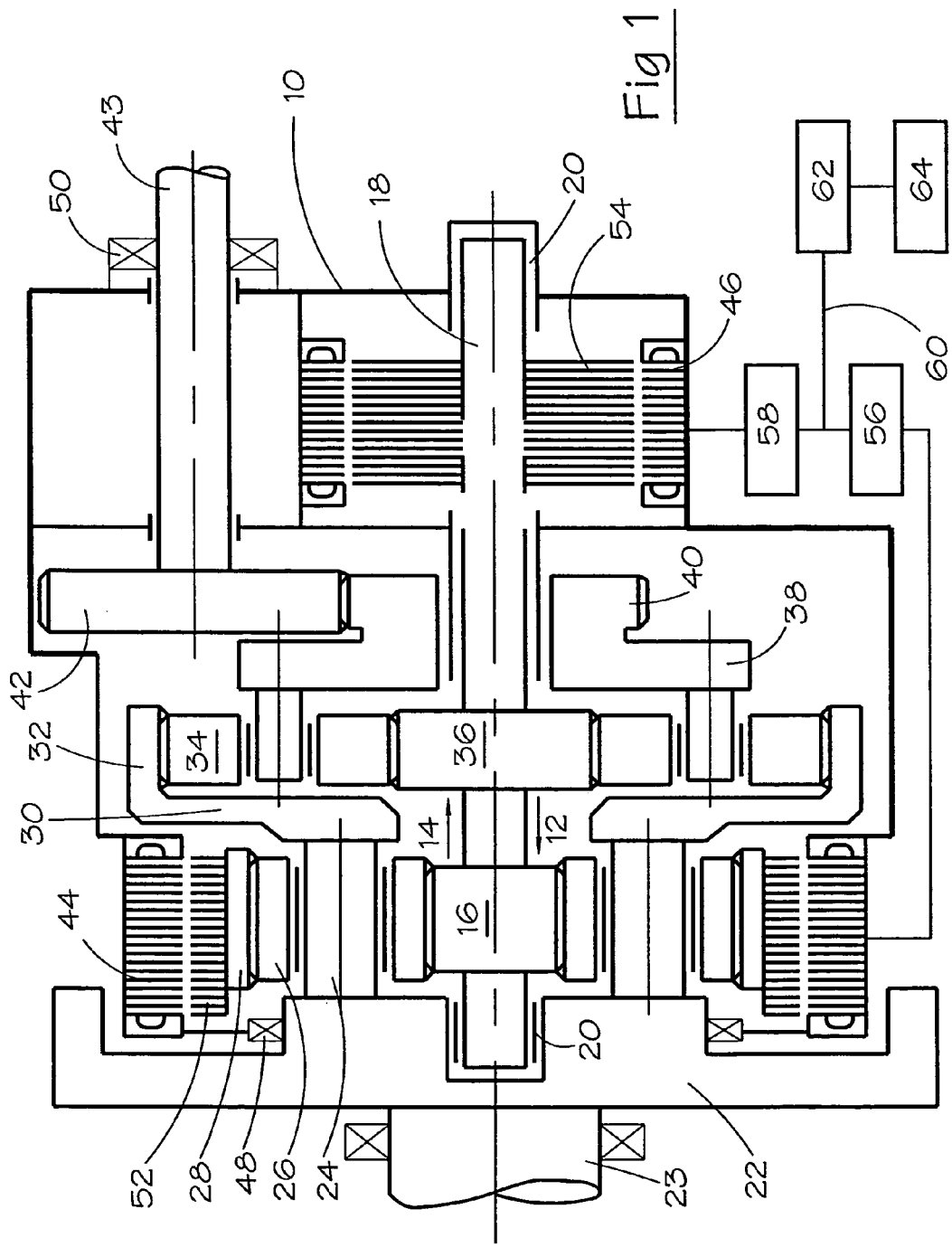
FIG. 1 is a schematic view of an electro-mechanical transmission system, which is or is operated in accordance with embodiments of the invention.

The transmission system shown in FIG. 1 comprises an outer housing 10 accommodating two epicyclic gearsets 12 and 14. The first gearset 12 comprises a first sun wheel 16, which is fixedly carried by a shaft 18, which is mounted to rotate with respect to the housing 10 by bearings 20. A first carrier 22, which constitutes a flywheel and is connected to an input shaft 23 carries a number (in this case three) of equispaced shafts 24, which carry respective first planet wheels 26. The first planet wheels 26 are in mesh with the first sun wheel 16 and with an internally toothed first annulus wheel 28.

The first carrier 22 is connected via a radial flange 30 to an annulus wheel 32 of the second gearset. The second annulus wheel 32 is in mesh with a plurality of second planet wheels 34 carried by a second carrier 38. The planet wheels 34 are also in mesh with a second sun wheel 36 fixedly carried by the shaft 18. The second carrier 38 includes an externally toothed portion 40, which is in mesh with a gearwheel 42 connected to the output shaft 43.

The transmission system includes first and second electrical machines, which are capable of acting as both a motor and a generator. The machines are in this case brushless and, specifically, switched reluctance type as described in the paper "The Characteristics, Design and Applications of Switched Reluctance Motors and Drives" by Dr. J. M. Stephenson and Dr. R. J. Blake as presented at PCIM 93, Nurnberg, Germany, Jun. 21–24, 1993, which paper is incorporated herein by reference. However, any type of machine could be used that can act as a motor or a generator. The machines include respective first and second stators 44 and 46, which are fixed to the housing 10. The first stator 44 is sealed with respect to the flywheel 22 by means of an oil seal 48 and a similar oil seal 50 is provided between the output shaft and the outer housing. The first machine also includes a first rotor 52, which is connected to rotate with the first annulus wheel 28. The second machine includes a second rotor 54, which is connected to rotate with the shaft 18 and thus with the two sun wheels 16, 36.

As discussed in the Stephenson/Blake paper, the supply of electrical energy to/from the stator of each machine is by means of power rails known as the "dc link".

The windings of the two stators 44, 46 are connected via respective controllers 56, 58 of known type, which form part of an overall control system, to a common dc link shown schematically as line 60. The controllers are connected, in use, to e.g. the engine management system of the vehicle in which the transmission is installed. They are used in a manner to control the electrical machines and the voltage applied to the dc link 60 by that machine which is acting as a generator and thus to control the electrical power that is transferred between the two machines. This control is the means by which the output speed, and thus the transmission ratio of the transmission system, are varied in response to commands by the user, e.g. by the application of pressure to the brake or accelerator pedals. The dc link 60 is also connected to a further controller 62, by which electrical power is diverted to a dump resistor 64.

Figure 2:
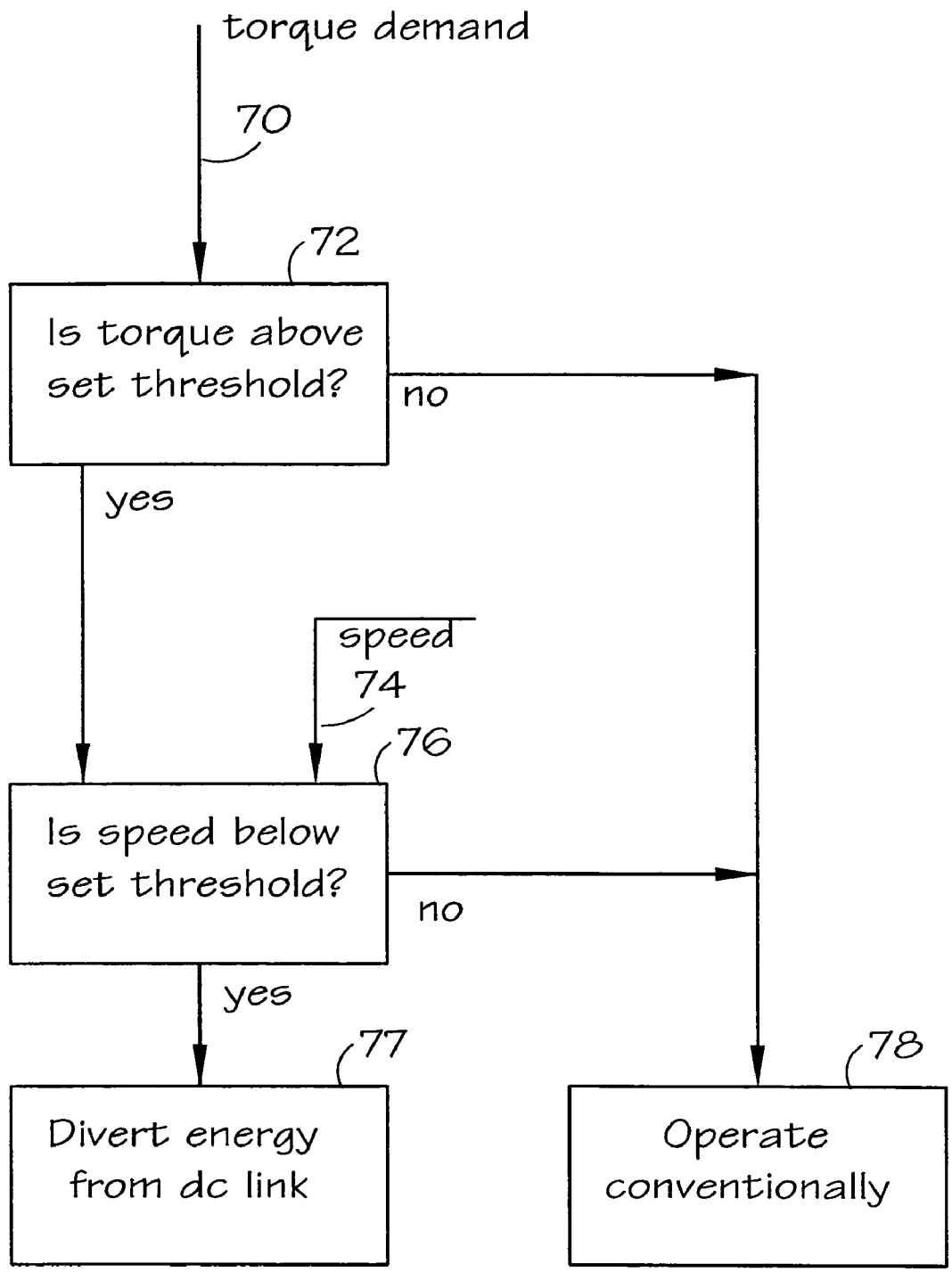
FIG. 2 is a flowchart of a control scheme by which embodiments of the invention are implemented using the system of FIG. 1.

FIG. 2 shows a basic flowchart for the algorithm contained in the controller 62 of one embodiment of the invention. A signal is received on line 70, which is representative of the torque required on the output shaft 43. For a system with a closed-loop torque control, this signal corresponds to the torque error based on a comparison of torque on the output shaft and torque demanded, for example. For a system with open-loop torque control, this represents the torque demand set by the user, for example; e.g. in a vehicle drive, it represents the position of an accelerator pedal. As such, it is an output demand that is indicative of a desired speed, or even acceleration, as much as torque itself.

At box 72, the torque demand signal is compared with a predetermined torque level. As explained above, embodiments of the invention are best put into practice when the torque requirement cannot be met by conventional operation of the drive, i.e. when the torque demanded is above a known threshold. Although it is useable at lower torques, it inevitably reduces the efficiency of the drive, so it is generally desirable to reserve it for those torques that are above the normal range for the given system.

A signal representing the speed of the output shaft 43 is provided on line 74. In a vehicle, for example, this would correspond to road speed. At box 76 the speed signal is compared with a predetermined speed level. As explained above, it is in the lower speed range of the transmission that the power source connected to the input shaft 23 will have more power available than the transmission can translate to the output shaft.

If both the tests in boxes 72 and 76 yield a positive outcome, then control passes to box 77 where the controller responds by diverting energy from the dc link, in one of the ways described above. In the event that a lower torque is required, or the speed of the output shaft has risen above the predetermined level, control passes to box 78 where conventional operation of the transmission system is invoked.

It will be appreciated by those skilled in the art that a variety of refinements can be made to the order and content of the algorithm described in FIG. 2. According to one example, the transition into and out of diverting energy to boost the torque according to embodiments of the invention is made gradual with respect to time to avoid sudden changes of output torque. This is achievable in a variety of ways apparent to those of skill in the art using control algorithms such as proportional-plus-integral (P+I) control, for example.

The power at the input shaft varies with the electrical power flowing between the two electrical machines. As the output speed increases from zero, the electrical power flow decreases until a first node point is reached at which the power flow is zero. As the output speed continues to increase, the electrical power flow progressively increases again but in the opposite direction, indicating that the two machines which were previously acting as a motor and a generator are now acting as a generator and a motor respectively. As the output speed continues to increase, the power flow again reaches a second maximum and then decreases to zero again at a further node point. The power flow again reverses direction and rises to a further maximum. The so-called Node Span Ratio, which is the ratio of the output speeds at the two node points, is desirably in excess of 2 or 2.5 or even 3.

In use, for example, the input shaft of the transmission system is connected to an automotive engine or other prime mover and the output shaft is connected to a pair of driven wheels of a vehicle via a differential or the like, or to some other torque receiving device. The transmission system has numerous different applications.

If the transmission system is in the geared neutral condition and it is desired to accelerate rapidly, the controllers 56 and 58 are operated to substantially increase the power developed by that electrical machine which is operating as a generator and the controller 62 is operated simultaneously to dump power in the dump resistor 64. The torque acting on the input shaft 23 will increase to a value sufficient to compensate for the power transmitted to the dump resistor 64. The torque applied to the output shaft will be the sum of the torques on the two motors/generators and the torque on the input shaft. The transmission of electrical power to the dump resistor is desirable principally when the engine is not at its power limit but high torques are required at the output shaft, typically at zero and low output speeds.

Figure 3A:
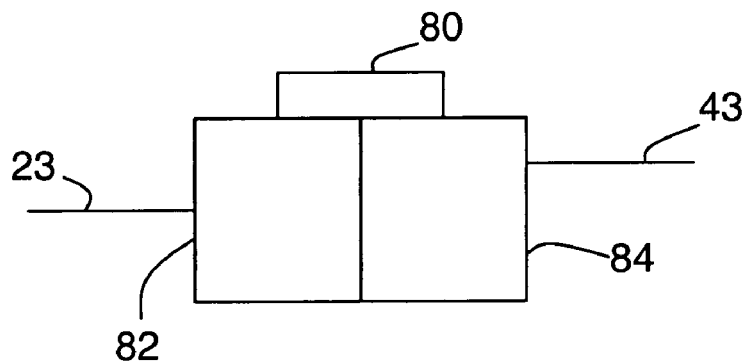
FIGS. 3A–3B are schematic diagrams in accordance with embodiments of the invention.
Figure 3B:
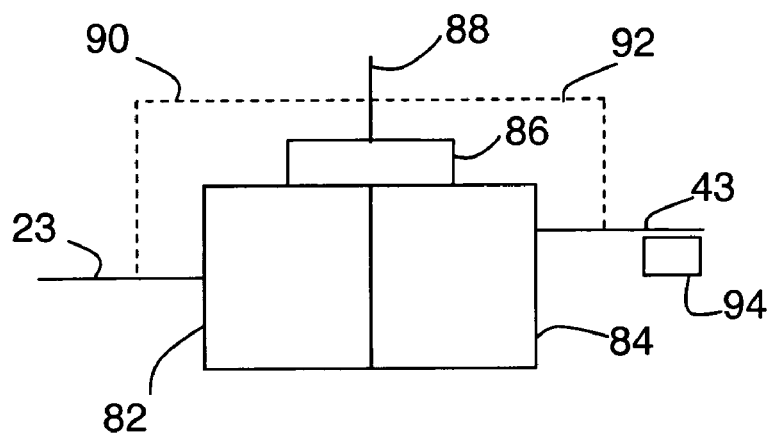

As illustrated schematically in FIG. 3A, embodiments of the invention include mechanical brake 80 arranged to brake at least one of the two previously described electrical machines 82, 84. As illustrated schematically in FIG. 3B, the transmission system optionally does not include brake 80 but a third electrical machine 86 instead, which is operable as a motor and whose output shaft 88 is connected (as represented schematically by dashed lines 90, 92) to one of the input and output shafts 23, 43 and which is connected to at least one of the said two electrical machines 82, 84 to be electrically powered thereby.

In one embodiment, a sensor 94 is provided which produces the signal on line 70 indicative of the torque required at the output shaft. When the transmission system is fitted into a motor vehicle, this sensor conveniently responds to the position of the accelerator pedal, according to one example, by way of a demand signal. This signal is monitored by the control system and only when its magnitude exceeds a predetermined level, thus indicating that a high level of torque is required at the output shaft, is the controller 62 operated to transmit power to the dump resistor 64.

What is claimed is:

1. An electro-mechanical transmission system, comprising at least two compounded epicyclic gearsets, one gear element of a first of the gearsets being connected to an input shaft which is connected to a prime mover, and one gear element of a second of the gearsets being connected to an output shaft, rotors of two electric machines being connected to respective gear elements of the first and second gearsets, electrical connections of stators of the machines being connected together via a controller arranged to control flow of electrical power between the machines and an energy receiver, the controller being operable to direct at least a proportion of electrical power from one of the machines operating as a generator to the energy receiver to increase the torque applied to the output shaft.

2. A system as claimed in claim 1 in which electrical power from the machine operating as a generator is diverted from the other machine to the energy receiver.

3. A system as claimed in claim 1 in which the controller is operable to compare a signal indicative of demanded torque with a predetermined threshold and to direct the proportion of electrical power to the energy receiver when the signal exceeds the predetermined threshold.

4. A system as claimed in claim 1 in which the controller is operable to compare a signal indicative of the speed of the output shaft with a predetermined threshold and to direct the proportion of electrical power to the energy receiver when the signal is below the predetermined threshold.

5. A system as claimed in claim 4 in which the predetermined threshold is a first predetermined threshold, further in which the controller is operable to compare a signal indicative of demanded torque with a second predetermined threshold and to direct the proportion of electrical power to the energy receiver only when the signal indicative of demanded torque exceeds the second predetermined threshold and when the signal indicative of the speed of the output shaft is below the first predetermined threshold.

6. A system as claimed in claim 3 in which a transition to directing the proportion of electrical power is governed by a control process including proportional-plus-integral action.

7. A system as claimed in claim 1 in which the controller is operable to extract power from the transmission system to increase the torque applied to the output shaft.

8. A method of operating an electro-mechanical transmission system comprising at least two compounded epicyclic gearsets, one gear element of a first of the gearsets being connected to an input shaft which is connected to a prime mover, and one gear element of a second of the gearsets being connected to an output shaft, rotors of two electric machines being connected to respective gear elements of the first and second gearsets, electrical connections of stators of the machines being connected together such that electrical power is transferable between the machines and an energy receiver, the method comprising extracting power from the transmission system by directing at least a proportion of electrical power from one of the machines operating as a generator to the energy receiver to increase the torque applied to the output shaft.

9. A method as claimed in claim 8 in which the electrical power from the machine operating as a generator is diverted from the other machine to the energy receiver.

10. A method as claimed in claim 8 in which a controller is operable to compare a signal indicative of demanded torque with a predetermined threshold and to direct the proportion of electrical power to the energy receiver when the signal exceeds the predetermined threshold.

11. A method as claimed in claim 8 in which a controller is operable to compare a signal indicative of the speed of the output shaft with a predetermined threshold and to direct the proportion of electrical power to the energy receiver when the signal is below the predetermined threshold.

12. A method as claimed in claim 11 in which the predetermined threshold is a first predetermined threshold, further in which the controller is operable to compare a signal indicative of demanded torque with a second predetermined threshold and to direct the proportion of electrical power to the energy receiver only when the signal indicative of demanded torque exceeds the second predetermined threshold and when the signal indicative of the speed of the output shaft is below the first predetermined threshold.

13. A method as claimed in claim 10 in which a transition to directing the proportion of electrical power is governed by a control process including proportional-plus-integral action.

14. A method of operating an electro-mechanical transmission system comprising at least two compounded epicyclic gearsets, having an input shaft driven by a prime mover and connected to one gear element of a first of the gearsets, an output shaft providing output torque and connected to one gear element of a second of the gearsets, two electrical machines, rotors of which are connected to respective gear elements of the first and second gearsets and each of which is able to operate either as a motor or a generator and stators of which are connected together via a controller arranged to control the flow of electrical power between the machines, which method includes increasing the torque available at the output shaft by extracting power from the transmission system by directing electrical power from at least one of the machines to an electrical load comprising a dump resistor.

15. A method of operating an electro-mechanical transmission system comprising at least two compounded epicyclic gearsets, having an input shaft driven by a prime mover and connected to one gear element of a first of the gearsets, an output shaft providing output torque and connected to one gear element of a second of the gearsets, two electrical machines, rotors of which are connected to respective gear elements of the first and second gearsets and each of which is able to operate either as a motor or a generator, a third electrical machine, operable as a motor, and having its output shaft connected to one of the input and output shafts of the transmission system, all three machines having electrical connections of their stators connected together via a controller arranged to control the flow of electrical power between the machines, which method includes increasing the torque available at the output shaft by extracting power by directing electrical power from at least one of the machines which is operating as a generator to the third electrical machine.

16. A method of operating an electro-mechanical transmission system comprising at least two compounded epicyclic gearsets, having an input shaft driven by a prime mover and connected to one gear element of a first of the gearsets, an output shaft providing output torque and connected to one gear element of a second of the gearsets, two electrical machines, rotors of which are connected to respective gear elements of the first and second gearsets and each of which is able to operate either as a motor or a generator and stators of which are connected together via a controller arranged to control the flow of electrical power between the machines, which method includes increasing the torque available at the output shaft by extracting power from the transmission system by directing electrical power from at least one of the machines which is operating as a generator to an electrical load comprising a rechargeable electric battery.

17. A method of operating an electro-mechanical transmission system comprising at least two compounded epicyclic gearsets, having an input shaft driven by a prime mover and connected to one gear element of a first of the gearsets, an output shaft providing output torque and connected to one gear element of a second of the gearsets, two electrical machines, rotors of which are connected to respective gear elements of the first and second gearsets and each of which is able to operate either as a motor or a generator and stators of which are connected together via a controller arranged to control the flow of electrical power between the machines, which method includes monitoring a signal indicative of the level of torque required at the output shaft and extracting energy in mechanical or electrical form from the transmission system when the said signal exceeds a predetermined value.

18. A method as claimed in claim 17, further including accelerating the output shaft from a rest condition, in which the two electrical machines act as a generator and a motor, respectively.

19. An electro-mechanical transmission system comprising at least two compounded epicyclic gearsets, having an input shaft adapted to be driven by a prime mover and connected to one gear element of a first of the gearsets, an output shaft which, in use, provides output torque and is connected to one gear element of a second of the gearsets, two electrical machines, rotors of which are connected to respective gear elements of the first and second gearsets and each of which is able to operate either as a motor or a generator and stators of which are connected together via a controller arranged to control the flow of electrical power between the machines, and a mechanical brake arranged to brake at least one of the electrical machines to increase the torque applied to the output shaft.

20. A system as claimed in claim 19 in which the controller is operable to extract power from the transmission system to increase the torque applied to the output shaft.

21. An electro-mechanical transmission system comprising at least two compounded epicyclic gearsets, having an input shaft adapted to be driven by a prime mover and connected to one gear element of a first of the gearsets, an output shaft which, in use, provides output torque and is connected to one gear element of a second of the gearsets, two electrical machines, rotors of which are connected to respective gear elements of the first and second gearsets and each of which is able to operate either as a motor or a generator and stators of which are connected together via a controller arranged to control the flow of electrical power between the machines and a third electrical machine to increase the torque applied to the output shaft, the third electrical machine being operable as a motor and whose output shaft is connected to one of the input and output shafts and which is connected to at least one of said two electrical machines to be electrically powered thereby.

22. A system as claimed in claim 21 in which the controller is operable to extract power from the transmission system to increase the torque applied to the output shaft.

23. An electro-mechanical transmission system comprising at least two compounded epicyclic gearsets, having an input shaft adapted to be driven by a prime mover and connected to one gear element of a first of the gearsets, an output shaft which, in use, provides output torque and is connected to one gear element of a second of the gearsets, two electrical machines, rotors of which are connected to respective gear elements of the first and second gearsets and each of which is able to operate either as a motor or a generator and stators of which are connected together via a controller arranged to control the flow of electrical power between the machines, a sensor arranged to produce a signal indicative of the level of torque required at the output shaft, means for monitoring said signal and means controlled by the monitoring means for extracting power in mechanical or electrical form from the transmission system when said signal exceeds a predetermined value.

* * * * *